United States Patent [19]

Takeyasu et al.

[11] Patent Number: 5,300,535
[45] Date of Patent: Apr. 5, 1994

[54] METHOD FOR PRODUCING POLYURETHANE FLEXIBLE FOAM

[75] Inventors: Hiromitsu Takeyasu, Tokyo; Sigeyuki Kozawa, Yokohama, both of Japan

[73] Assignee: Asahi Glass Company Ltd., Tokyo, Japan

[21] Appl. No.: 659,259

[22] Filed: Feb. 22, 1991

Related U.S. Application Data

[63] Continuation-in-part of Ser. No. 499,346, Oct. 18, 1989, Pat. No. 5,093,380.

[30] Foreign Application Priority Data

| | | |
|---|---|---|
| Oct. 25, 1988 [JP] | Japan | 63-267297 |
| Feb. 10, 1989 [JP] | Japan | 1-29644 |
| Feb. 23, 1990 [JP] | Japan | 2-40959 |

[51] Int. Cl.$^5$ ............................ C08J 9/04; C08L 75/08
[52] U.S. Cl. .................................... 521/137; 521/174; 521/176
[58] Field of Search ................... 521/137, 174, 176

[56] References Cited

U.S. PATENT DOCUMENTS

| | | | |
|---|---|---|---|
| Re. 28,715 | 2/1976 | Stamberger | 521/137 |
| 3,075,926 | 1/1963 | Stewart et al. | 521/137 |
| 3,884,848 | 5/1975 | Ricciardi et al. | 521/111 |
| 4,049,590 | 9/1977 | Falkenstein et al. | 521/137 |
| 4,098,733 | 7/1978 | Olstowski et al. | 521/137 |
| 4,107,101 | 8/1978 | Kubens | 521/137 |
| 4,125,487 | 11/1978 | Olstowski et al. | 521/137 |
| 4,230,823 | 10/1980 | Alberts et al. | 521/137 |
| 4,332,716 | 6/1982 | Shah | 521/137 |
| 4,366,301 | 12/1982 | Le Roy et al. | 528/66 |
| 4,439,548 | 3/1984 | Weisman | 521/137 |
| 4,482,582 | 11/1984 | Weisman | 521/137 |
| 4,493,908 | 1/1985 | Fisk | 521/137 |
| 4,568,705 | 2/1986 | Grace et al. | 521/137 |
| 4,689,357 | 8/1987 | Hongu et al. | 521/176 |
| 4,701,474 | 10/1987 | Bailey, Jr. et al. | 521/137 |
| 4,725,629 | 2/1988 | Garvey et al. | 521/137 |
| 4,826,882 | 5/1989 | Bredbenner et al. | 521/112 |
| 5,081,180 | 1/1992 | Bourguignon et al. | 521/137 |

FOREIGN PATENT DOCUMENTS

| | | |
|---|---|---|
| 0008444 | 3/1980 | European Pat. Off. . |
| 0394487 | 10/1990 | European Pat. Off. . |

*Primary Examiner*—John Kight, III
*Assistant Examiner*—Rabon Sergent
*Attorney, Agent, or Firm*—Oblon, Spivak, McClelland, Maier & Neustadt

[57] ABSTRACT

A method for producing a polyurethane flexible foam, which comprises reacting at least one high molecular weight polyol selected from the group consisting of a polyoxyalkylene polyol having a hydroxyl value of from 5 to 38 mgKOH/g, from 2 to 8 hydroxyl groups and a total unsaturation degree of not more than 0.07 meq/g and a polymer-dispersed polyol containing said polyoxyalkylene polyol as the matrix, an optional crosslinking agent and a polyisocyanate compound in the presence of a low viscosity compound having an addition-polymerizable unsaturated group, a catalyst, a foaming agent and a foam stabilizer.

11 Claims, No Drawings

METHOD FOR PRODUCING POLYURETHANE FLEXIBLE FOAM

CROSS-REFERENCE TO RELATED APPLICATION

This application is a continuation in part of U.S. patent application Ser. No. 07/499,346 filed Oct. 18, 1989 now U.S. Pat. No. 5,093,380 (International Application No. PCT/JP89/01067) and incorporated entirely herein by reference.

BACKGROUND OF THE INVENTION

The present invention relates to a polyurethane flexible foam and a method for its production. Particularly, it relates to a polyurethane flexible foam having excellent physical properties as a seat cushion for automobiles, and a method for its production.

In recent years, various new studies have been made to improve the properties of polyurethane flexible foam. For example, reflecting a trend for grading up of e.g. automobiles, improvement of the vibration characteristics of seat cushions, is desired. The relation between the vibration of the car body and the human being is not uniform. However, it is suggested that it is effective for the improvement of the comfortable ride to take a particularly large attenuation of the frequency region (e.g. from 4 to 8 Hz or from 6 to 20 Hz) to which human being is particularly sensitive. Accordingly, it is considered possible to substantially improve the comfortable ride if the seat cushion is made of a polyurethane flexible foam having a resonant frequency lower than this frequency region. However, heretofore, no polyurethane flexible foam has been known which has a resonant frequency of less than 4 Hz.

Heretofore, one of the present inventors has proposed the invention concerning a polyurethane flexible foam having a low resonant frequency (International Patent Application No. PCT/JP89/01067). The main essential feature of this invention is to use a polyoxyalkylene polyol having a low hydroxyl value and a low total unsaturation degree as a starting material for the polyurethane flexible foam.

SUMMARY OF THE INVENTION

The present invention is to improve the above mentioned former invention, and is characterized in the combination use of a low viscosity compound having an addition-polymerizable unsaturated group with a polyoxyalkylene polyol.

That is, the present invention resides in a method for producing a polyurethane flexible foam, which comprises reacting at least one high molecular weight polyol selected from the group consisting of a polyoxyalkylene polyol having a hydroxyl value of from 5 to 38 mgKOH/g, from 2 to 8 hydroxyl groups and a total unsaturation degree of not more than 0.07 meq/g and a polymer-dispersed polyol containing said polyoxyalkylene polyol as the matrix, an optional crosslinking agent and a polyisocyanate compound in the presence of a low viscosity compound having an addition-polymerizable unsaturated group, a catalyst, a foaming agent and a foam stabilizer.

DETAILED DESCRIPTION OF THE INVENTION

The present invention solves the problem that it sometimes becomes hard to satisfactorily mix starting materials in the preparation of a polyurethane foam since a polyoxyalkylene polyol having a low hydroxyl value and a high total unsaturation degree has a high viscosity.

A low viscosity compound used in the present invention lowers the viscosity of a polyoxyalkylene polyol when it is mixed with the polyoxyalkylene polyol. Thus, the low viscosity compound works as a diluent. However, general diluents such as inert solvents cause various problems that they remain in polyurethane foams and that they dissolve polyurethane foams. Further, low boiling inert compounds (such as halogenated hydrocarbons) work also as foaming agents, and it is therefore necessary to control the amounts of other foaming agents such as water in order to control the extent of foaming. Another big problem is that these compounds plasticize resin ingredients, thereby degrading physical properties of polyurethane foams, particularly hardness, elasticity, flexibility and the like. On the other hand, a low viscosity compound used in the present invention is converted into a resin in the polymerization step to produce a polyurethane foam, and therefore it does not lower the hardness and the flexibility but rather improve these properties in many cases. Thus, the low viscosity compound achieves not only the effect of reducing the viscosity but also the effect of improving physical properties of the polyurethane foam.

As starting materials for a polyurethane foam, it is essential to use a polyol and a polyisocyanate compound.

In the present invention, particularly a high molecular polyoxyalkylene polyol is used as a polyol, and a low viscosity compound is also used as an essential component as mentioned above. Moreover, assisting agents such as a catalyst, a foaming agent and a stabilizer are generally essential. Thus, the polyurethane foam of the present invention is prepared from these starting materials.

The polyurethane foam of the present invention is preferably a flexible polyurethane foam. It is preferable for the polyurethane flexible foam of the present invention that its resonant frequency is less than 4 Hz, particularly not higher than 3.5 Hz. Further, it is preferable that a 6 Hz transmittance is not higher than 0.7. In addition, the impact resiliency of the core is preferably at least 70%, and further, the wet heat permanent strain is preferably not higher than 15%. A polyurethane flexible foam having these physical properties can be produced by using particularly a high molecular polyoxyalkylene polyol without using a low viscosity compound, but its production was not easy due to the viscosity problem of the high molecular polyoxyalkylene polyol. According to the present invention, not only the viscosity problem can be solved but also the above mentioned physical properties can be improved. For example, the resonant frequency can be made not higher than 3.2 Hz, and the 6 Hz transmittance can be made not higher than 0.5. Further, the impact resiliency of the core can be made at least 80%, and the wet heat permanent strain can be made not higher than 10%.

Now, each starting material component used in the present invention will be described.

Low Viscosity Compound

It is essential for a low viscosity compound that it has an addition-polymerizable unsaturated group and that its viscosity should be substantially lower than that of a polyoxyalkylene polyol used. The viscosity of the low viscosity compound should preferably be not higher than 300 centipoises (cP), particularly not higher than 100 cP at 25° C. Furthermore, the low viscosity compound should be liquid at normal temperature and have a fully high boiling point since it is preferable to maintain its liquid state even under the reaction conditions of producing a polyurethane foam. The low viscosity compound is added in such an amount as that the viscosity of its mixture with a polyoxyalkylene polyol may become not higher than ⅚, particularly not higher than ⅔ of the original viscosity of the polyoxyalkylene polyol. For example, in the case of a polyoxyalkylene polyol having a viscosity of about 4,000 cP, it is preferable that the amount of the low viscosity compound added should preferably be selected so that the viscosity of the mixture may become not higher than about 3,000 cP, particularly not higher than about 2,500 cP. In some cases, a foaming agent such as a halogenated hydrocarbon is added to the above two components, thereby the viscosity of the resultant mixture being further lowered. Thus, the low viscosity compound is generally added in an amount of from 1 to 40 parts by weight, preferably from 2 to 20 parts by weight to 100 parts by weight of the polyoxyalkylene polyol.

The low viscosity compound may have or may not have a functional group (e.g. a hydroxyl group or an amino group) reactive with an isocyanate group. However, generally, it is not preferable to use a compound having many functional groups since it is incorporated into a polyurethane chain, which results in unfavorable crosslinking. It is preferable that the presence of the functional group reactive with an isocyanate group should be one at most, and it is more preferable that a compound which does not substantially have such a functional group is used. On the other hand, an addition-polymerizable unsaturated group may be present in an amount of two or more per molecule. It is preferable that a compound having from 1 to 3 addition-polymerizable unsaturated groups is used.

Concrete Examples of the low viscosity compound include an acrylate type compound, a methacrylate type compound, a vinyl ether type compound, a vinyl ester type compound, an allyl ether type compound, an allyl ester type compound and the like. For example, there may be enumerated poly(or mono) ethylene glycol di(or mono) acrylate, poly(or mono) ethylene glycol di(or mono) methacrylate, poly(or mono) propylene glycol di(or mono) acrylate, poly(or mono) propylene glycol di(or mono) methacrylate, alkoxypoly(or mono) ethylene glycol acrylate, alkoxypoly(or mono) ethylene glycol methacrylate, alkoxypoly(or mono) propylene glycol acrylate, alkoxypoly(or mono) propylene glycol methacrylate, glycerol triacrylate, glycerol diacrylate, glycerol trimethacrylate, glycerol dimethacrylate, trimethylolpropane triacrylate, trimethylolpropane trimethacrylate, alkylvinyl ether, hydroxyalkylvinyl ether and the like. The number of the repeating units of the oxyalkyl group of a polyethylene glycol or a polypropylene glycol should preferably be not more than 9, and the carbon number of an alkoxy group or an alkyl group should preferably be not more than 4.

It is considered to be necessary that the low viscosity compound should be polymerized to produce a polymer under the reactions of foaming a polyurethane foam and that it should be incorporated into the polyurethane resin. It is therefore necessary to employ such conditions as to polymerize the low viscosity compound. In some cases, this polymerization may proceed by the reaction heat under the above mentioned reaction conditions without using a polymerization initiator or a polymerization accelerator, and in other cases, it may be preferable to use a polymerization initiator or a polymerization accelerator. Thus, in such a case, it is preferable to add such a compound to the starting materials as to initiate polymerization reaction in the temperature range of producing the above polyurethane foam. Examples of such compounds include organic peroxides, azo-hydrocarbons, azonitriles, N-nitroso compounds, nitrites, nitrates, sulfides, sulfines, and the like.

Polyoxyalkylene Polyol

It is necessary that a high molecular weight polyoxyalkylene polyol used in the present invention should preferably have a hydroxyl value (X) of from 5 to 38 mgKOH/g, from 2 to 8 hydroxyl groups and a total unsaturation degree (Y) of not more than 0.07 meq/g. This polyoxyalkylene polyol is preferably a polyoxyalkylene polyol containing at least 70% by weight of oxyalkylene groups of at least 3 carbon atoms (particularly oxypropylene groups derived from 1,2-propyleneoxide) and wherein the hydroxyl value (X mgKOH/g) and the total unsaturation degree (Y meq/g) are in the relation of the following formula (1), and $Y \leq 0.07$ and X is from 5 to 38:

$$Y \leq 0.9/(X-10) \tag{1}$$

The average number of hydroxyl groups per molecule of this polyoxyalkylene polyol is preferably from 2 to 8, more preferably from 2 to 6. Further, a polymer-dispersed polyol having this polyoxyalkylene polyol as the matrix and a mixture of such a polymer-dispersed polyol and this polyoxyalkylene polyol, are also preferred polyols.

The polyoxyalkylene polyol used as a starting material for polyurethane, is usually produced by ring-opening addition polymerization of an alkylene oxide such as propylene oxide to an initiator such as a polyhydric alcohol by means of an alkali catalyst such as an alkali metal hydroxide. In such a process, a monool having an unsaturated group is formed as a byproduct, and the production rate of this unsaturated monool increases with an increase of the molecular weight of the polyol (with a decrease of the hydroxyl value). The presence of this unsaturated monool is not in such a serious amount in the case of a polyoxyalkylene polyol having a hydroxyl value of about 56 which is widely used as a starting material for polyurethane flexible foam. However, in a polyoxyalkylene polyol having a low hydroxyl value which is used as a starting material for e.g. polyurethane elastomer, the presence of this unsaturated monool is likely to create a problem. For example, with a polyoxyalkylene polyol having a hydroxyl value of about 34, the total unsaturation degree usually becomes at least 0.1 meq/g. Further, it has been practically impossible to prepare a polyoxyalkylene polyol having a still lower hydroxyl value by means of an alkali catalyst, since its total unsaturation degree becomes remarkably high.

Further, even if an flexible foam is produced by using a polyoxyalkylene polyol having a high total unsaturation degree, there will be problems such as a decrease in the hardness, a decrease in the impact resiliency, a deterioration in the compression permanent strain, a deterioration in the curability at the time of molding the foam, etc.

The polyoxyalkylene polyol used in the present invention has a low unsaturation degree as compared with a starting material commonly employed for polyurethane flexible foam, whereby the conventional problems, particularly the problems observed in the case of employing a high molecular weight polyoxyalkylene polyol having a hydroxyl value of not higher than 38 (a decrease in the hardness, a decrease in the impact resiliency, a deterioration in the compression permanent strain and a deterioration in the curability at the time of molding the foam) can be controlled, and it is excellent in the vibration attenuation properties.

Such a polyoxyalkylene polyol can usually be obtained by using a catalyst other than an alkali catalyst, for example, by using zinc diethyl, iron chloride, metal porphyrin or a double metal cyanide complex, as the catalyst. A particularly excellent polyoxyalkylene polyol is obtainable by the use of a double metal cyanide complex. Methods for producing such a polyoxyalkylene polyol are disclosed, for example, in the following documents:

U.S. Pat. No. 3,829,505, U.S. Pat. No. 3,941,849, U.S. Pat. No. 4,355,188,
U.S. Pat. No. 3,427,334, U.S. Pat. No. 3,427,335, U.S. Pat. No. 4,472,560,
U.S. Pat. No. 4,477,589, EP 283,148.

In the present invention, as the polyol, at least one member of the above-mentioned polyoxyalkylene polyols having a low unsaturation degree and low hydroxyl value, may be employed. Further, in addition to the polyoxyalkylene polyol, a polyol having from 2 to 8, particularly from 2 to 4 hydroxyl groups, such as a polyester-type polyol, a hydroxyl group-containing polydiene-type polymer or a polycarbonate-type polyol, may optionally incorporated, as the case requires. It is particularly preferred to use at least one polyoxyalkylene polyol or a polymer-dispersed polyol containing such a polyoxyalkylene polyol as the matrix, or to use it as the main component in combination with a small amount (usually not more than 30% by weight) of a polyester-type or a hydroxyl group-containing polydiene-type polymer.

As the polyoxyalkylene polyol in the present invention, polyhydric alcohols, saccharides, alkanolamines, polyhydric phenols, polyoxyalkylene polyols obtained by adding alkylene oxides thereto and having molecular weights lower than the desired products, or polyoxyalkylene polyols obtained by adding at least one type of monoepoxide to other initiators, may be used. As the monoepoxide, it is preferred to use 1,2-propylene oxide, 1,2-butylene oxide, 2,3-butylene oxide, styrene oxide, at least one of other alkylene oxides having at least 3 carbon atoms, and a combination of at least one of them with ethylene oxide. Particularly preferred is at least one of 1,2-propylene oxide, 1,2-butylene oxide and 2,3-butylene oxide, or a combination of at least one of them with ethylene oxide. Most preferred is a polyoxyalkylene polyol containing at least 70% by weight, particularly at least 80% by weight, of oxypropylene groups derived from 1,2-propylene oxide.

As the above polyoxyalkylene polyol, a polyoxyalkylene polyol having a high primary hydroxyl value is preferred. Such a polyoxyalkylene polyol has oxyethylene groups or polyoxyethylene block chains at its molecular terminals. The proportion of such oxyethylene groups present at the terminal portions is preferably at least 2% by weight, more preferably from 5 to 30% by weight, most preferably from 5 to 20% by weight.

The polyoxyalkylene polyol in the present invention may be a mixture of two or more different types. However, it is preferred that it does not substantially contain a polyoxyalkylene polyol with a hydroxyl value exceeding 38. In such a case, the hydroxyl value, the number of hydroxyl groups and the total unsaturation degree are represented by average values. In the present invention, the polyoxyalkylene polyol has the upper limit of Y being 0.07 when X is not higher than about 22.9. More preferably, the upper limit of Y is 0.04 (when X is from about 32.5 to 38, the formula (1) will apply). Further, the hydroxyl value is more preferably from 5 to 28.

Polymer-Dispersed Polyol

As the polyol of the present invention, a polymer-dispersed polyol can be employed. The polyol as the matrix for the polymer-dispersed polyol is required to be the above-mentioned polyoxyalkylene polyol. The polymer-dispersed polyol is a dispersion having fine polymer particles dispersed stably in this matrix. As the polymer, an addition polymerization polymer or a condensation polymerization polymer may be mentioned. A polymer-dispersed polyol wherein the matrix is a conventional polyol, is known and is widely used a polyol for polyurethane flexible foam. The polymer-dispersed polyol in the present invention can be produced by a conventional method using the above polyoxyalkylene polyol as the matrix. Further, a relatively small amount of a conventional polymer-dispersed polyol may be added to the above polyoxyalkylene polyol. In such a case, a polyol constituting the matrix of the conventional polymer-dispersed polyol will be added in a small amount to the above polyoxyalkylene polyol. Even in such a case, the relation of the hydroxyl value and the total unsaturation degree of the above polyoxyalkylene polyol is required to be satisfied as an average. Thus, the polyoxyalkylene polyol constituting the matrix for the polymer-dispersed polyol in the present invention, is required to satisfy the above requirements (e.g. the relation of the hydroxyl value and the total unsaturation degree).

The fine polymer particles in the polymer-dispersed polyol are made of an addition polymerization type polymer such as a homopolymer or copolymer of acrylonitrile, styrene, methacrylate, an alkyl methacrylate, an alkyl acrylate or other vinyl monomer, or a condensation polymerization type polymer such as a polyester, polyurea, polyurethane or a melamine resin. By the presence of such fine polymer particles, the hydroxyl value of the entire polymer-dispersed polyol will usually be lower than the hydroxyl value of the polyol as the matrix. Accordingly, the hydroxyl value of the entire polymer-dispersed polyol having the above polyoxyalkylene polyol as the matrix, is preferably from 5 to 38, more preferably from 5 to 28.

The content of the fine polymer particles in the polymer-dispersed polyol or in a mixture of such polymer-dispersed polyol and the above polyoxyalkylene polyol, is usually not higher than 60% by weight, preferably not higher than 40% by weight. The amount of the fine polymer particles is not required to be large. On the other hand, even if the amount is excessive, there is no particular disadvantage other than the economical disadvantage. In most cases, they are sufficiently effective in an amount of not higher than 20% by weight.

The presence of fine polymer particles in the polyoxyalkylene polyol is not essential. However, the presence is effective for the improvement of the hardness, the air permeability and other physical properties of the foam. Accordingly, the fine polymer particles are preferably present in an amount of at least 0.1% by weight, more preferably at least 1% by weight, most preferably at least 2% by weight.

Crosslinking Agent

In the present invention, it is possible to react only the above polyoxyalkylene polyol having a low hydroxyl value (i.e. a high molecular weight) (provided that water is excluded) with the isocyanate compound. However, a low molecular weight polyfunctional compound reactive with an isocyanate group (which is called a crosslinking agent in the present invention) can be used together with the high molecular weight polyoxyalkylene polyol. This polyfunctional compound is preferably a compound having at least two isocyanate-reactive groups such as hydroxyl groups, primary amino groups or secondary amino groups and having a molecular weight of not higher than 600, particularly not higher than 300, per isocyanate-reactive group. Such a crosslinking agent includes a compound which is usually called a crosslinking agent or a chain extender in the polyurethane technical field. Such a compound includes, for example, polyhydric alcohols, alkanolamines, polyamines, and low molecular weight polyoxyalkylene polyol type polyols obtained by adding small amounts of alkylene oxides to polyhydric alcohols, alkanolamines, saccharides, polyamines, monoamines or polyhydric phenols. Further, low molecular weight polyester type polyols or polyamines may also be employed. Preferably, polyhydric alcohols such as ethylene glycol, propylene glycol, 1,4-butanediol and glycerol, alkanolamines such as diethanolamine and triethanolamine, polyoxyalkylene type polyols having a hydroxyl value of at least 200, and polyamines such as t-butyltolylenediamine, diethyltolylenediamine and chlorodiaminobenzene, are employed. Particularly preferred are polyoxyalkylene type polyols having a hydroxyl value of at least 200 and from 3 to 8 hydroxyl groups. Such a polyfunctional compound is used preferably in an amount of not higher than about 10 parts by weight, particularly not higher than 5 parts by weight, per 100 parts by weight of the high molecular weight polyol. There is no particular restriction as to the lower limit of the amount. However, in its use, adequate effectiveness is obtainable with an amount of about 0.2 part by weight.

Polyisocyanate Compound

The polyisocyanate compound may be an aromatic, alicyclic or aliphatic polyisocyanate having at least two isocyanate groups, a mixture of at least two such polyisocyanates, as well as modified polyisocyanates obtained by modifying them. Specifically, there may be mentioned, for example, polyisocyanates such as tolylene diisocyanate (TDI), diphenylmethane diisocyanate (MDI), polymethylenepolyphenyl isocyanate (so called crude MDI), xylylene diisocyanate (XDI), isophorone diisocyanate (IPDI) and hexamethylene diisocyanate (HMDI), and their prepolymer type modified products, nulate modified products, urea modified products and carbodiimide modified products. Preferably, at least one aromatic polyisocyanate selected from TDI, MDI, crude MDI and their modified products, is employed. More preferably, a mixture comprising at least one of MDI, crude MDI and their modified products and TDI or its modified products, is employed. The amount of TDI is preferably from 50 to 100% by weight.

The isocyanate group content in the polyisocyanate compound in the present invention is preferably at least 15% by weight, particularly preferably at least 20% by weight.

Other Starting Material Components

For the reaction of the polyol and the polyisocyanate compound, it is usually required to employ a catalyst. As the catalyst, a metal compound catalyst such as an organotin compound for accelerating the reaction of the active hydrogen-containing group with the isocyanate group, or a tertiary amine catalyst such as triethylenediamine, may be used. Further, a polymerization catalyst for reacting isocyanate groups to one another, such as a metal salt of a carboxylic acid, may be used as the case requires. Further, in many cases, a foam stabilizer for forming good foam, is used. As the foam stabilizer, a foam stabilizer of silicone type or a foam stabilizer of fluorine-containing compound type may, for example, be mentioned. Other optional additives include, for example, a filler such as silica, alumina or calcium carbonate, an antioxidant, an ultraviolet absorber, a stabilizer such as a photostabilizer, a colorant and a flame retardant.

As mentioned above, in the present invention, as the foaming agent, a water type foaming agent, a halogenated hydrocarbon such as R-11 (trichlorofluoromethane), R-12 (difluorodichloromethane), R-123 (1,1-dichloro-2,2,2-trifluoroethane), R-12B$_2$ (difluorodibromomethane), R-141b (1,1-dichloro-1-fluoroethane) or methylene chloride, butane, hexane, air or nitrogen, may be employed. The water-type foaming agent may be water itself or a compound capable of generating water at the time of the reaction, such as a hydrate. A low boiling point halogenated hydrocarbon may be used as a foaming agent in combination with the water-type foaming agent.

In a case where a water-type foaming agent is employed as the foaming agent, a part of the above polyisocyanate compound reacts with water to generate carbon dioxide gas. Accordingly, the amount of the polyisocyanate compound used is calculated on the basis of the sum obtained by adding the water-type foaming agent to the total of the high molecular weight polyol and the low molecular weight polyfunctional compound, and it is preferred to use the polyisocyanate compound in an amount of from 0.8 to 1.3 equivalent relative to 1 equivalent of the sum. 100 Times of the equivalent of this polyisocyanate compound is usually called (isocyanate) index. Accordingly, the index of the polyisocyanate compound is preferably from 80 to 130.

In the following, the present invention will be explained more concretely in reference to practical examples, although the present invention is not restricted by these examples.

EXAMPLES

Polyoxyalkylene Polyol

The following polyoxyalkylene polyols were used as starting materials for polyurethane flexible foams described hereinafter. Each polyol was prepared by conducting addition reaction of propylene oxide by means of polyoxypropylene polyol having a molecular weight of from 400 to 600 as an initiator and a zinc hexacyanocobaltate complex as a catalyst, then deactivating the catalyst, and conducting addition reaction of ethylene oxide by means of an alkali catalyst, followed by purification to remove the catalyst component. In Table 1, the names of the obtained polyoxyalkylene polyols, and the numbers of hydroxyl groups (N), the hydroxyl values (X), the oxyethylene contents (EO), the total unsaturation degrees (Y) and the viscosities at 25° C. of the polyoxyalkylene polyols, are shown below.

Polyol A: N=3, EO=15 wt %, X=24 mgKOH/g, Y=0.020 meq/g, Viscosity=1,900 cP

Polyol B: N=3, EO=12 wt %, X=16 mgKOH/g, Y=0.025 meq/g, Viscosity=3,000 cP

Polyol C: N=4, EO=10 wt %, X=16 mgKOH/g, Y=0.023 meq/g, Viscosity=4,000 cP

Other starting materials for a polyurethane flexible foam are as follows:

Low Viscosity Compound

Low viscosity compound A: Methoxydiethylene glycol methacrylate, Viscosity=80 cP (The viscosity of a mixture of low viscosity compound A/Polyol A having a weight ratio of 5/100 is 1,400 cP.)

Low viscosity compound B: Methoxydipropylene glycol methacrylate, Viscosity=60 cP (The viscosity of a mixture of low viscosity compound B/Polyol B having a weight ratio of 8/100 is 1,600 cP.)

Low viscosity compound C: Propylene glycol dimethacrylate, Viscosity=90 cP (The viscosity of a mixture of low viscosity compound C/Polyol C having a weight ratio of 10/100 is 2,200 cP.)

Catalyst

Catalyst A: Triethylenediamine solution ("Dabco 33LV" tradename)

Catalyst B: N-ethylmorpholine

Catalyst C: Tertiary amine catalyst ("Kaolizer No. 1" tradename, sold by Kao Corporation)

Foaming Agent

Water

Foam Stabilizer

Foam stabilizer A: Silicone type foam stabilizer ("L-5309" tradename, sold by Nippon Unika K.K.)

Foam stabilizer B: Silicone type foam stabilizer ("SF-2962" tradename, sold by Toray Silicone K.K.)

Polyisocyanate Compounds

Isocyanate A: Tolylene diisocyanate (TDI-80)

Isocyanate B: Mixture of TDI-80 and crude MDI ("Coronate C-1021" tradename, sold by Nippon Polyurethane K.K.) in a weight ratio of 80/20.

Isocyanate C: Modified MDI for polyurethane flexible foam (NCO content: 27%)

Preparation of Polyurethane Flexible Foam

The polyisocyanate compound was added to a mixture of all the starting materials except for the polyisocyanate compound, followed by stirring. The mixture was immediately injected into a mold of 350 mm×350 mm and 100 mm in height heated to 50° C. (60° C. in Examples 2 and 3), and the mold was closed and placed at 80° C. in an oven to cure for 8 minutes. Then, the molded polyurethane flexible foam was taken out from the mold. Then, the following physical properties of the foam were measured.

Density (core): JIS K6401
25% ILD: JIS K6401
Impact resilience: JIS K6401
Elongation: JIS K6401
Wet heat permanent strain: JIS K6401
Resonant frequency: JASO B407-82
6 Hz transmittance: JASO B407-82

EXAMPLE 1

A polyurethane flexible foam was prepared from Isocyanate A (Index 102) and a mixture of Polyol A 100 parts (part by weight, hereinafter the same), water 4 parts, Catalyst A 0.4 part, Catalyst B 0.4 part, Foam stabilizer A 1.2 parts and low viscosity compound A 5 parts, and the polyurethane flexible foam thus obtained was satisfactory.

COMPARATIVE EXAMPLE 1

A comparative polyurethane flexible foam was prepared using the same starting material as in Example 1, except that the low viscosity compound A was omitted.

EXAMPLE 2

A polyurethane flexible foam was prepared from Isocyanate B (Index 100) and a mixture of Polyol B 100 parts, a crosslinking agent 3 parts (having a hydroxyl value of 450 obtained by adding propylene oxide and ethylene oxide into sorbitol), water 3.3 parts, Catalyst A 0.6 part, Catalyst C 0.5 part, Foam stabilizer B 1.0 part and low viscosity compound B 8 parts, and the polyurethane flexible foam thus obtained was satisfactory, and had favorable cell state on the surface.

COMPARATIVE EXAMPLE 2

A comparative polyurethane flexible foam was prepared using the same starting material as in Example 2, except that the low viscosity compound B was omitted and that R-123 8 parts and water 2.9 parts were used as a foaming agent in place of water 3.3 parts.

EXAMPLE 3

A polyurethane flexible foam was prepared from Isocyanate C (Index 100) and a mixture of Polyol C 100 parts, water 3.8 parts, Catalyst A 0.6 part, Catalyst C 0.4 part, Foam stabilizer A 1.0 part and low viscosity compound C 10 parts, and the polyurethane flexible foam thus obtained was satisfactory, and had favorable cell state on the surface.

COMPARATIVE EXAMPLE 3

A comparative polyurethane flexible foam was prepared using the same starting material as in Example 3 except that the low viscosity compound C was omitted. The polyurethane flexible foam thus obtained was partly collapsed due to immiscibility.

Physical properties of the foams obtained in the above Examples and Comparative Examples are shown in the following Table 1.

TABLE 1

|  | Example 1 | Comparative Example 1 | Example 2 | Comparative Example 2 | Example 3 | Comparative Example 3 |
|---|---|---|---|---|---|---|
| Density [Kg/m$^2$] | 35 | 35 | 41 | 40 | 42 | 42 |
| ILD (25%) [Kg/314 cm$^2$] | 17.2 | 15.9 | 20.5 | 15.0 | 25.0 | 20.0 |
| Impact resilience [%] | 68 | 60 | 82 | 74 | 81 | 70 |
| Elongation [%] | 130 | 115 | 130 | 125 | 125 | 97 |
| Wet heat permanent strain [%] | 9 | 11 | 9 | 15 | 5 | 15 |
| Resonant frequency [Hz] | 3.2 | 3.5 | 2.95 | 3.32 | 2.92 | 3.35 |
| 6 Hz Transmittance | 0.45 | 0.55 | 0.42 | 0.65 | 0.41 | 0.68 |

As mentioned above, according to the present invention, immiscibility problem in the production of a polyurethane foam by using a polyoxyalkylene polyol having a low hydroxyl value, particularly having a high molecular weight, can be solved by using a low viscosity compound having an addition-polymerizable unsaturated group as an agent for reducing viscosity. In addition, the degradation of physical properties of a polyurethane foam can be more prevented than the case of using a solvent as a viscosity-reducing agent, and some of the physical properties can be rather improved by using the viscosity-reducing agent of the present invention.

What is claimed is:

1. A method for producing a polyurethane flexible foam, which comprises reacting at least one high molecular weight polyol selected from the group consisting of a polyoxyalkylene polyol having a hydroxyl value of from 5 to 38 mgKOH/g, from 2 to 8 hydroxyl groups and a total unsaturation degree of not more than 0.7 meq/g and a polymer dispersed polyol containing said polyoxyalkylene polyol as the matrix, an optional cross-linking agent and a polyisocyanate compound in the presence of from 1 to 40 parts by weight, to 100 parts by weight of said high molecular weight polyol, of a low viscosity compound having a viscosity not higher than 300 cP at 25° C. and lower than the viscosity of said polyoxyalkylene polyol and having an addition-polymerizable unsaturated group but not an active hydrogen reactive with an isocyanate group, a catalyst, a foaming agent and a foam stabilizer.

2. The method according to claim 1, wherein the low viscosity compound having an addition-polymerizable unsaturated group is at least one compound selected from the group consisting of alkoxypoly(or mono) ethylene glycol methacrylate, poly(or mono) ethylene glycol dimethacrylate, alkoxypoly(or mono) propylene glycol methacrylate and poly(or mono) propylene glycol dimethacrylate.

3. The method according to claim 1, wherein the polyoxyalkylene polyol has a hydroxyl value (X) (mgKOH/g) and a total unsaturation degree (Y) (meq/g) in the relation of $Y \leq 0.9/(X-10)$ for values of X from about 32.5 to 38.

4. The method according to claim 1, wherein the polyoxyalkylene polyol has a hydroxyl value (X) of from 5 to 35 mgKOH/g and a total unsaturation degree (Y) of not more than 0.04 meq/g.

5. The method according to claim 1, wherein the polyoxyalkylene polyol is a polyoxyalkylene polyol having an oxypropylene group content of at least 70% by weight and optionally containing oxyethylene groups.

6. The method according to claim 5, wherein the polyoxyalkylene polyol is a polyoxyalkylene polyol containing at least 5% by weight of terminal oxyethylene groups.

7. The method according to claim 1, wherein the polyisocyanate compound is at least one compound selected from the group consisting of tolylene diisocyanate, diphenylmethane diisocyanate, polymethylene polyphenylisocyanate and modified products thereof.

8. The method according to claim 1, wherein a cross-linking agent having at least two isocyanate-reactive groups and having a molecular weight of not higher than 600 per isocyanate-reactive group is used, in addition to a polyoxyalkylene polyol having a hydroxyl value of from 5 to 38.

9. The method of claim 1 wherein the viscosity of the low viscosity compound is not higher than 100 cP at 25° C. and lower than the viscosity of the polyoxyalkylene polyol.

10. A polyurethane flexible foam produced by the method according to claim 1.

11. The polyurethane flexible foam according to claim 10, having a 6 Hz transmittance of not more than 0.5, an impact resiliency of core of at least 80% and a wet heat compression permanent strain of not more than 10%.

* * * * *